United States Patent
Evans et al.

(10) Patent No.: US 8,727,627 B2
(45) Date of Patent: May 20, 2014

(54) APPARATUS AND METHOD FOR CONTROLLED RELEASE OF LUBRICANT ADDITIVES IN BEARING AND GEAR ASSEMBLIES

(75) Inventors: Ryan D. Evans, North Canton, OH (US); Paul J. Shiller, Youngstown, OH (US); David A. Pierman, Medina, OH (US); Gary L. Doll, Canton, OH (US)

(73) Assignee: The Timken Company, Canton, OH (US)

( * ) Notice: Subject to any disclaimer, the term of this patent is extended or adjusted under 35 U.S.C. 154(b) by 261 days.

(21) Appl. No.: 13/395,806

(22) PCT Filed: Sep. 13, 2010

(86) PCT No.: PCT/US2010/048608
§ 371 (c)(1),
(2), (4) Date: Mar. 13, 2012

(87) PCT Pub. No.: WO2011/032081
PCT Pub. Date: Mar. 17, 2011

(65) Prior Publication Data
US 2012/0170883 A1    Jul. 5, 2012

Related U.S. Application Data

(60) Provisional application No. 61/242,017, filed on Sep. 14, 2009.

(51) Int. Cl.
*F16C 33/66*    (2006.01)
*F16H 57/04*    (2010.01)

(52) U.S. Cl.
USPC .............. 384/462; 384/463; 384/470; 74/467

(58) Field of Classification Search
USPC ......... 384/462, 467, 470, 473, 474, 475, 469; 74/467; 508/510, 563
See application file for complete search history.

(56) References Cited

U.S. PATENT DOCUMENTS

| 4,066,559 A | 1/1978 | Rohde |
| 4,492,415 A | 1/1985 | Baile et al. |

(Continued)

FOREIGN PATENT DOCUMENTS

| DE | 10258842 | 7/2004 |
| EP | 1803792 | 4/2007 |

(Continued)

OTHER PUBLICATIONS

Tallian T.E.: Mild Wear, Failure Atlas for Hertz Contract Machine Elements, ASME Press, New York, 1999, pp. 109-113.

(Continued)

*Primary Examiner* — Phillip A Johnson
(74) *Attorney, Agent, or Firm* — Michael Best & Friedrich LLP

(57) ABSTRACT

A structure (200) for containing a volume of lubricant additive gel (10) which is disposed within a mechanical system, in close proximity to a wear critical surface, and which is configured to provide a release of the contained additives into a flow of lubricant over time or as a function of temperature in a site-specific manner to minimize wear or reduce oil oxidation due to harsh operating conditions. The structure defines a cage or capsule with screen or mesh sides (202) having multiple perforations or openings through which the flow of lubricant may circulate. Within the contained volume of the structure (200), additives are disposed in a gel matrix (10), and are release over time or as a function of temperature, through the perorations or openings, in close operative proximity to wear critical surfaces of the mechanical system such as a bearing assembly or gear arrangement.

17 Claims, 4 Drawing Sheets

(56) References Cited

U.S. PATENT DOCUMENTS

| | | | | |
|---|---|---|---|---|
| 7,384,896 | B2 * | 6/2008 | George et al. | 508/291 |
| 7,534,747 | B2 * | 5/2009 | Burrington et al. | 508/113 |
| 7,833,955 | B2 * | 11/2010 | Burrington et al. | 508/391 |

FOREIGN PATENT DOCUMENTS

| | | |
|---|---|---|
| JP | 2003156056 | 5/2003 |
| JP | 2007232087 | 9/2007 |
| JP | 2008039052 | 2/2008 |
| WO | 2007024590 | 3/2007 |
| WO | 2007148047 | 12/2007 |

OTHER PUBLICATIONS

Notification of Transmittal of the International Search Report and the Written Opinion of International Searching Authority, or the Declaration; International Appl. No. PCT/US2010/048608 filed Nov. 26, 2010.

* cited by examiner

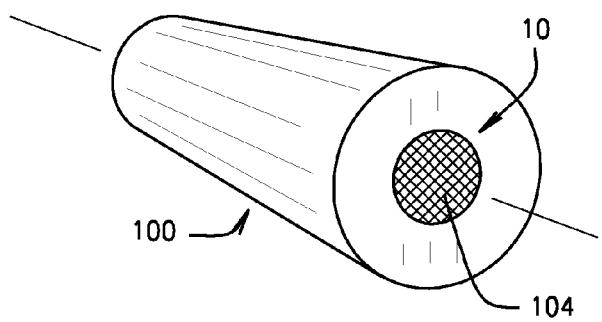
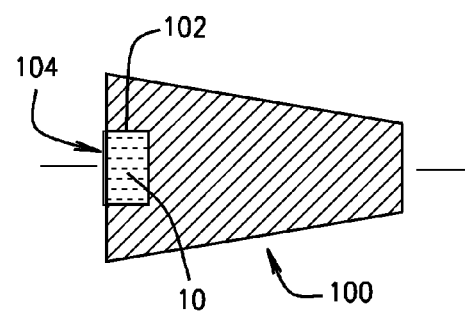
FIG. 2A     FIG. 2B
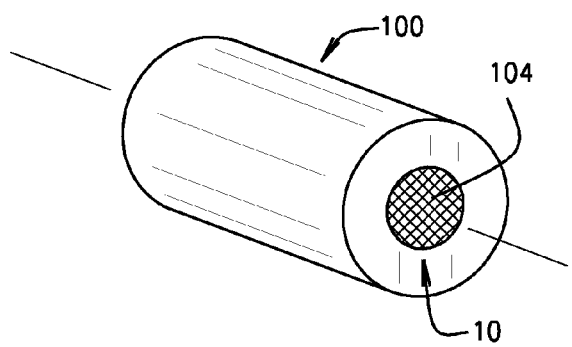
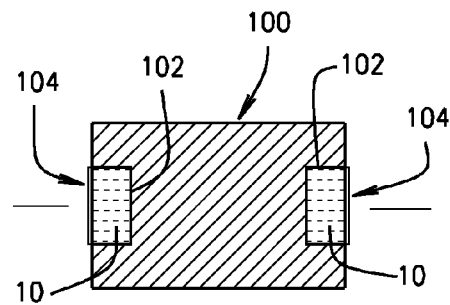
FIG. 3A     FIG. 3B
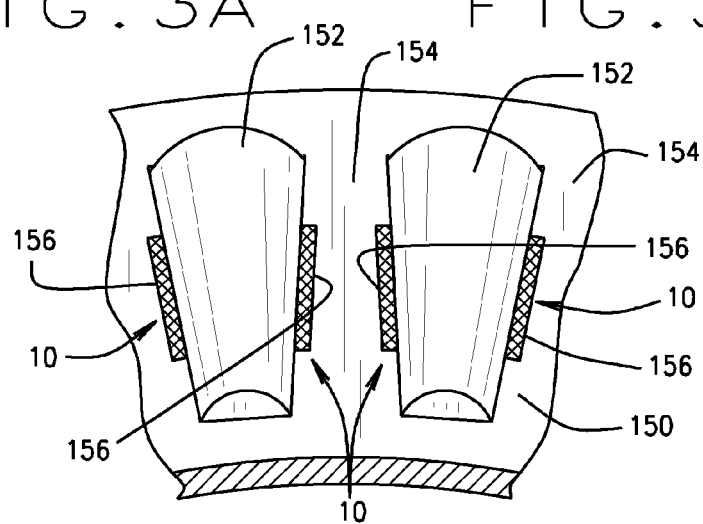
FIG. 4

APPARATUS AND METHOD FOR CONTROLLED RELEASE OF LUBRICANT ADDITIVES IN BEARING AND GEAR ASSEMBLIES

CROSS-REFERENCE TO RELATED APPLICATIONS

The present application is the United States National Stage under 35 U.S.C. §371 of International Application Serial No. PCT/US2010/048608, having an international Filing Date of Sep. 13, 2010. International Application Serial No. PCT/US2010/048608 is related to, and claims priority from, U.S. Provisional Patent Application Ser. No. 61/242,017 filed on Sep. 14, 2009, and which is herein incorporated by reference.

STATEMENT REGARDING FEDERALLY SPONSORED RESEARCH

Not Applicable.

BACKGROUND OF THE INVENTION

The present application is related to the protection of bearing components and gear assemblies from wear or oil oxidation, and in particular to the protection of such components and assemblies by containing a volume of controlled-release additive gel in operative proximity to the bearing components and gear assemblies.

Lubricant additive chemical technology is well known to improve the wear resistance of metallic surfaces. Similarly, anti-oxidant additives have been engineered to prolong the life of hydrocarbon lubricants by hindering oxidation reactions. The traditional approach for using these lubricant additives is to supply the additives with the initial lubrication as a full formulations. However, with this traditional approach, once the additives are depleted from the lubricant, they are not replenished until fresh lubricant is supplied. Furthermore, the additives are dispersed within the flow of lubricant through the entire lubrication system, and may not be present at sufficient quantity where needed, or may be depleted by reactions at non-critical or non-wear surfaces within the system.

Various mechanical systems which operate in conjunction with lubricant filters have been designed in an attempt to provide a uniform dispersion of additives into a volume of lubricant over time. These systems often include capsules, perforated sheets, baffles, or specially designed injectors for achieving a slow release of additive into a flow of lubricant passing through the lubrication filter. In alternate designs, a slow-release of lubricant additives within lubrication filters is achieved by incorporating additives into oil-soluble solid polymers such as thermoplastics, inert carriers, or oil-soluble gels. While these systems provide for a slow release of additives into the flow of lubricant passing through the lubrication filer, they ultimately fail to ensure that sufficient quantity of the additives are provided a critical locations or wear surfaces, due to the uniform dispersion of the additives within the flow of lubricant.

Accordingly, it would be advantageous to provide lubricated surfaces such as those found in bearing components and gear assemblies, with a source of beneficial lubricant additives which can be released in a controlled manner in proximity to wear critical surfaces as required to minimize wear or oil oxidation during operation.

BRIEF SUMMARY OF THE INVENTION

Briefly stated, the present disclosure provides a structure for containing a volume of lubricant additive gel which is disposed within a mechanical system, in close proximity to wear critical surfaces, and which is configured to provide a release of the contained additives over time or as a function of temperature in a site-specific manner to minimize wear or reduce oil oxidation due to harsh operating conditions. The structure defines a cage or capsule with screen or mesh sides having multiple perforations or openings through which a flow of lubricant may circulate. Within the contained volume of the structure, additives are disposed in a gel matrix, and are release over time or as a function of temperature, through the perorations or openings, in close operative proximity to wear critical surfaces of the mechanical system.

In one embodiment the mechanical system is a bearing assembly, including at least one rolling element supported for rolling movement between first and second raceways. A contained volume of additive gel is operatively disposed in a recessed region adjacent at least one axial end of the rolling element, to provide a controlled release of the contained additives over time or as a function of temperature, through the perorations or openings, in close operative proximity to the wear surfaces the rolling element and raceways.

In an alternate embodiment the mechanical system is a bearing assembly, including a plurality of rolling elements supported for rolling movement between first and second raceways in a spaced configuration by a bearing cage structure having bridge members extending between each rolling element. A contained volume of additive gel is operatively disposed in a recessed region on at least one bridge element of the bearing cage adjacent to a surface of the rolling elements, to provide a controlled release of the contained additives over time or as a function of temperature, through the perorations or openings, in close operative proximity to the wear surfaces the rolling element and raceways.

In a further embodiment the mechanical system is a bearing assembly, including a plurality of rolling elements supported for rolling movement between first and second raceways of first and second races. A contained volume of additive gel is operatively disposed on at least one of the races in a recessed region adjacent at least one circumferential edge of the associated raceway and adjacent to a surface of the rolling elements, to provide a controlled release of the contained additives over time or as a function of temperature, through the perorations or openings, in close operative proximity to the wear surfaces the rolling element and raceways.

In yet another embodiment, the mechanical system is a gear assembly including at least one toothed gear for meshed engagement with a toothed or threaded structure. A contained volume of additive gel is operative disposed in a recessed region associated with at least one of the gear teeth to provide a controlled release of the contained additives over time or as a function of temperature, through the perorations or openings, in close operative proximity to the wear surfaces the tooth. The recessed region for receiving the contained volume of additive gel may be located either at the root (dedendum) of the gear tooth, or at the tip (addendum) of the gear tooth.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2A is a perspective illustration of a tapered rolling element having a recessed axial region for receiving a contained volume of additive gel;

FIG. 2B is a cross-sectional view of the tapered rolling element of FIG. 2A;

FIG. 3A is a perspective illustration of a cylindrical rolling element having recessed axial regions for receiving contained volumes of additive gel;

FIG. 3B is a cross-sectional view of the cylindrical rolling element of FIG. 3A;

FIG. 4 is a perspective illustration of the placement of contained volumes of additive gel on a bearing cage bridge component;

Corresponding reference numerals indicate corresponding parts throughout the several figures of the drawings. It is to be understood that the drawings are for illustrating the concepts set forth in the present disclosure and are not to scale.

Figure 1:
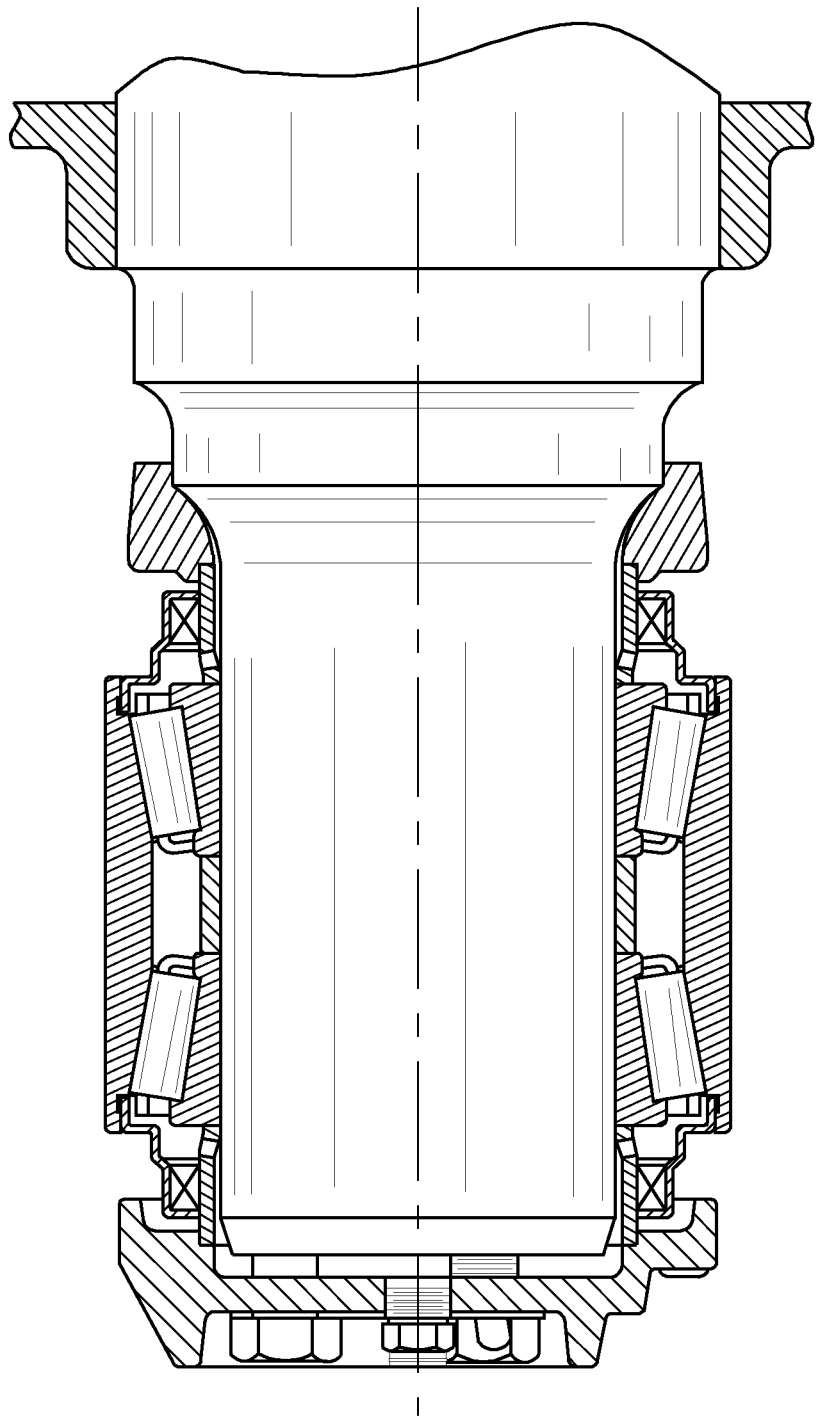
FIG. 1 is a sectional illustration of a prior art railroad bearing which may be adapted to utilized the contained volumes of additive gels of the present disclosure
Figure 5A:
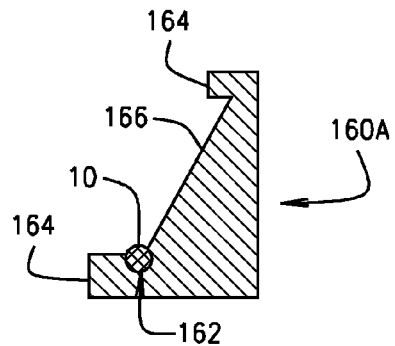
FIG. 5A is a sectional view of a bearing race for tapered rolling elements, illustrating placement of a contained volume of additive gel at the raceway-flange undercut location.
Figure 5B:
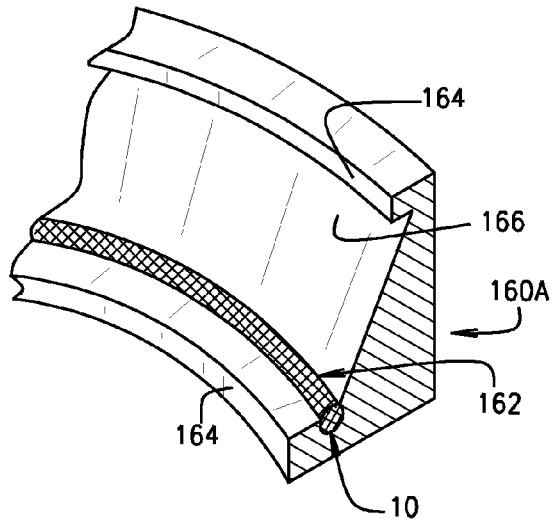
FIG. 5B is a perspective view of a portion of the raceway of FIG. 5A.
Figure 6A:
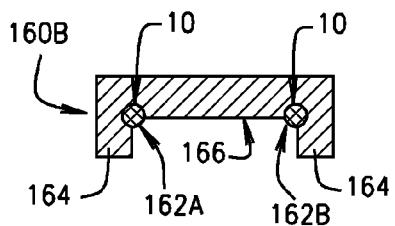
FIG. 6A is a sectional view of a bearing race for cylindrical rolling elements, illustrating placement of a contained volume of additive gel at the raceway-flange undercut locations.
Figure 6B:
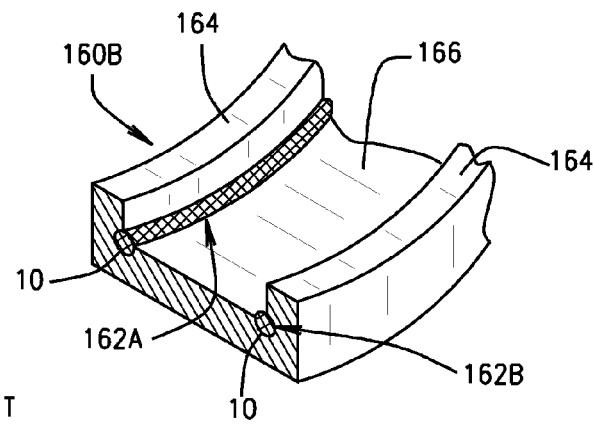
FIG. 6B is a perspective view of a portion of the raceway of FIG. 6A.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Lubricant additives retained or suspended in a gel form are not easily retained in their natural stage by specific placement within mechanical systems, such as friction management or power transmission systems shown in FIG. 1, as the mechanical properties of the gels are not suitable for adhesion onto a solid surface. Turning to the figures, and to FIG. 2A through FIG. 7 in particular, various components of mechanical systems such as rolling element bearings or gear assemblies are shown to be adapted with recessed regions in proximity to wear critical surfaces, to receive and to physically retain lubricant additive gels 10, either be enclosing the lubricant additive gel 10 within the recessed region by a screen or mesh, or by seating an additive gel 10 containing structure 200 within the recessed region. Additives disposed in the gel matrix are released into a passing flow of lubricant in a controlled manner, such as by gradual release over time or as a function of temperature from the recessed region, through the perorations or openings in the enclosure or containing structure 200, directly into close operative proximity to wear critical surfaces of the mechanical system.

Exemplary lubricant additive gels include wear resistant additive gels (extreme pressure "EP" or anti-wear "AW" gels) which can be designed to release beneficial molecules when the environment temperature reaches a designated threshold. During the onset of wear in the mechanical system, the operating temperature in the vicinity of the gel will begin to rise, prompting the release of the additives into the immediate environment when needed to slow the onset of any frictional damage and to extend the useful protection life of the lubricants. Additional lubricant additive gels include antioxidant components that may be designed to be released over time to prolong the life of circulating lubricant.

Figure 8A:
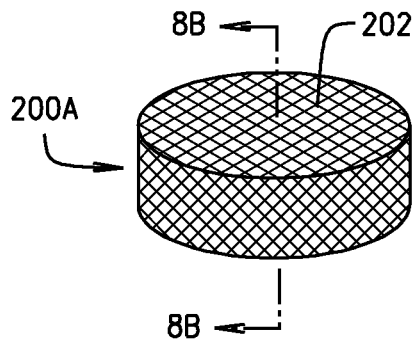
FIG. 8A is a perspective illustration of an exemplary mesh tablet containing an additive gel within a defined volume of space.
Figure 8B:
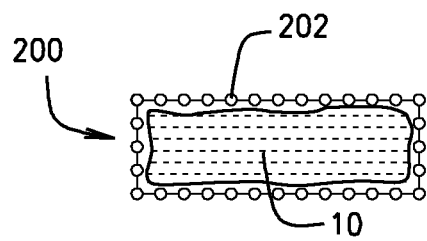
FIG. 8B is a cross section view of the mesh tablet of FIG. 8A, illustrating the additive containing gel disposed within the enclosing mesh structure.
Figure 9:
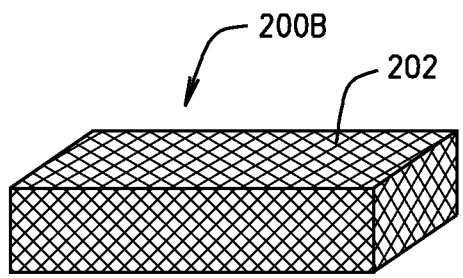
FIG. 9 is a perspective illustration of an exemplary mesh block containing an additive gel within a defined volume of space.
Figure 10:
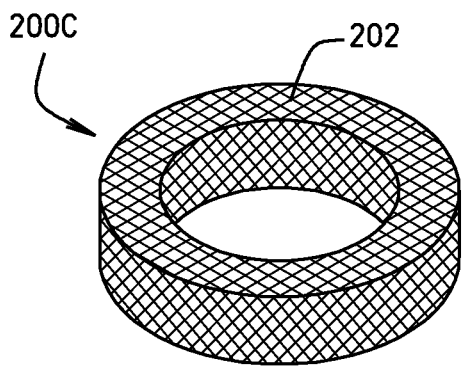
FIG. 10 is a perspective illustration of an exemplary mesh ring containing an additive gel within a defined volume of space.

Structures 200 of the present disclosure for containing a volume of lubricant additive gel for controlled release into a flow of lubricant are shown generally in tablet form 200A as seen in FIG. 8, box or brick form 200B as seen in FIG. 9, or annular/ring form 200C as best seen in FIG. 10. The various structures 200 are intended to be disposed within correspondingly sized recesses in a mechanical system, such as a rolling element bearing or gear assembly, in close proximity to wear critical surfaces, and are configured to facilitate a release of the contained lubricant additives into a flow of lubricant over time or as a function of temperature in a site-specific manner to minimize wear or reduce oil oxidation due to harsh operating conditions. Preferably, the structures 200 each define a cage or capsule, with screened, meshed, or slotted surfaces 202, having multiple perforations or openings through which a flow of lubricant may circulate to reach the gel additive, and through which the contained lubricant additives may be released as the gel dissolves.

Returning to FIGS. 2A through 3B, in one exemplary embodiment of the present disclosure, a rolling element 100 for use with a mechanical bearing assembly to support rolling movement between first and second raceways (not shown), is adapted to retain a lubricant additive gel in proximity to the rolling element surfaces and supporting raceway surfaces. A contained volume of additive gel 10 is operatively disposed in a recessed region 102 adjacent at least one axial end of the rolling element 100, to provide a controlled release of the contained additives from the gel 10 over time or as a function of temperature, through the perorations or openings in a cover, screen or retaining structure 104, in close operative proximity to the wear surfaces the rolling element and raceways. The recessed region 102 may be disposed at only one axial end of the rolling element, or both, and may extend either partially or completely through the axial length of the rolling element 100. For example, at the large end of tapered rolling elements as seen in FIGS. 2A and 2B, or at opposite axial ends of cylindrical rolling elements as seen in FIGS. 3A and 3B.

In a second exemplary embodiment shown in FIG. 4, a mechanical bearing assembly, includes a bearing cage structure 150 for positioning a plurality of rolling elements 152, such as tapered rollers, for rolling movement between first and second raceways (not shown) in a spaced configuration. The bearing cage structure 150 includes a plurality of bridge members 154 extending between each rolling element 152. A contained volume of additive gel 10 is operatively disposed in a recessed region 156 on at least one bridge member 154 of the cage structure 150, to provide a controlled release of the contained additives from the gel 10 over time or as a function of temperature, through perorations or openings in the enclosure, in close operative proximity to the wear surfaces the rolling elements 152 and raceways. The specific configuration and shape of the bearing cage structure 150 and bridge members 154 may be varied depending upon the shape and configuration of the rolling elements 152 of the bearing assembly, and accordingly, the specific shape and configuration of the recessed regions 156 in the bearing bridge members 154 may be modified accordingly.

In a third exemplary embodiment, a mechanical bearing assembly includes a plurality of rolling elements supported for rolling movement between first and second raceways of first and second races. As shown in FIGS. 5A through 6B, a contained volume of additive gel 10 is operatively disposed on at least one of the races 160 in a single recessed region 162 as shown in the angled race 160*a* of FIGS. 5A and 5B, or in a pair of recessed regions 162A and 162B as shown in the cylindrical race 160*b* of FIGS. 6A and 6B, adjacent at least one circumferential edge or rib 164 of the associated raceway 166. The contained volume of additive gel 10 provides a controlled release of the contained additives over time or as a function of temperature, through perorations or openings in an enclosing material, in close operative proximity to the wear surfaces the rolling element and raceways 166. The recessed region 162 may extend about the entire circumference of the race 160, forming a channel or annular recess, or may be defined by one or more discrete arcuate recessed segments.

Figure 7:
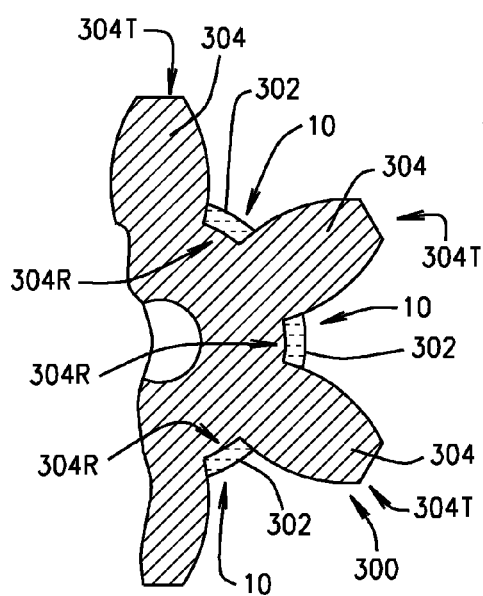
FIG. 7 is a sectional view of a toothed gear, illustrating the placement of contained volumes of additive gels at the gear tooth roots.

In yet another exemplary embodiment, shown in FIG. 7, a mechanical gear system or assembly including at least one toothed gear 300 for meshed engagement with a toothed or threaded structure (not shown) is adapted to receive and retain one or more volumes of the lubricant additive gel 10. The contained volumes of additive gel 10 are operative disposed in recessed regions 302 associated with at least one of the gear teeth 304 to provide a controlled release of the contained additives over time or as a function of temperature, through perorations or openings in an enclosing material, in close operative proximity to the wear surfaces the adjacent gear teeth 304. The recessed regions 302 for receiving the contained volumes of additive gel 10 may be located at the root (dedendum) 304R of the gear teeth 304, at the tip (addendum) 304T of the gear teeth 304, or at both locations. The specific placement and number of recessed regions 302 on a gear 300 may be varied depending upon the size, configuration, and application for which the gear 300 intended to be used.

Those of ordinary skill in the art will recognize that use of a lubricant additive gel 10 in a mechanical system such as a friction reducing system (i.e., bearing assembly) or power transmission system (i.e. gear assembly) as described herein is not limited to the specific exemplary embodiments set forth above. Any system in which a lubricant is utilized to reduce wear or friction between moving parts, and which risks damage or excessive wear upon the break-down of the lubricant, may benefit from the incorporation of a lubricant additive gel 10 disposed and contained in proximity to wear critical surfaces, such as within a bearing assembly of a packaged bearing unit. By incorporating gel-receiving recesses such as 102, 162, and 302 in close proximity to the wear critical surfaces, and by providing an additive gel 10 having a controlled release mechanism, such as one which is responsive to an increase in temperature to release additional additives from the gel 10, protection for the wear critical surfaces can be provided with improved efficiency.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for providing a controlled release wear protection to a mechanical component, comprising:
    providing the mechanical component with a recessed region (102, 162, 302) for receiving a lubricant additive gel (10) in operative proximity to a wear critical surface of the mechanical component;
    disposing the lubricant additive gel (10) containing lubricant additives within said recessed region; and
    securing said lubricant additive gel (10) within said recessed region on said mechanical component for controlled release of said lubricant additives into a flow of primary lubricant by dissolution of said gel in close proximity to said wear critical surface.

2. The method of claim 1 wherein said dissolution of said lubricant additive gel and said controlled release of said lubricant additives into said flow of lubricant is responsive to an increase in environmental temperature associated with increased wear on said proximate wear critical surface.

3. The method of claim 1 wherein said dissolution of said lubricant additive gel and said controlled release of said lubricant additive into said flow of lubricant is a time based release.

4. The method of claim 1 wherein said step of securing said additive gel (10) within said recessed region (102, 162, 302) includes containing said additive gel within a contained structure (200) adapted for fitment within said recessed region (102, 162, 302), said contained structure (200) defining a volume for receiving said additive gel (10) and having a plurality of openings between an external environment and said defined volume to facilitate said controlled release of said lubricant additives from said additive gel to said flow of lubricant.

5. A mechanical system having at least one mechanical component with a wear critical surface lubricated by a flow of lubricant, comprising:
    a recessed region (102, 162, 302) on a surface (100, 154, 160, 304) within said mechanical system in proximity to said wear critical surface of the mechanical component and said flow of lubricant;
    a lubricant additive dissolvable gel (10) disposed within said recessed region (102, 162, 302);
    a retention structure (104, 202) configured to retain said lubricant additive dissolvable gel within said recessed region; and
    wherein said lubricant additive dissolvable gel contains lubricant additives adapted for controlled release through said retention structure into a flow of primary lubricant in proximity to said wear critical surface.

6. The mechanical system of claim 5 wherein said controlled release of said lubricant additives into said flow of primary lubricant is responsive to an increase in environmental temperature associated with increased wear on said wear critical surface.

7. The mechanical system of claim 5 wherein said controlled release of said lubricant additive into said flow of lubricant is a time-based release.

8. The mechanical system of claim 5 wherein said mechanical system is a bearing assembly, wherein said mechanical component is a rolling element (100), and wherein said surface with said recessed region is an axial end of said rolling element.

9. The mechanical system of claim 5 wherein said mechanical system is a bearing assembly, wherein said mechanical component is a rolling element (100) and wherein said surface with said recessed region (162A, 162B) is a race (160A, 160B) having a raceway (166) for supporting said rolling element.

10. The mechanical system of claim 9 wherein said recessed region is disposed adjacent a circumferential edge (164) of said raceway.

11. The mechanical system of claim 5 wherein said mechanical system is a bearing assembly, wherein said mechanical component is one of a plurality of rolling elements (152) secured in position about a raceway of a race by a bearing cage structure (150), and wherein said surface with said recessed region (156) is disposed on a bridge member (154) of said bearing cage structure separating adjacent rolling elements.

12. The mechanical system of claim 5 wherein said mechanical system is a gear assembly, wherein said mechanical component is a gear (300) having a plurality of gear teeth (304), each having a wear critical surface, and wherein said surface with said recessed region (302) is disposed on said gear in proximity to at least one of said gear teeth.

13. The mechanical system of claim 12 wherein said surface with said recessed region is disposed either at a gear root (304R) or at a gear tip (304T).

14. The mechanical system of claim 5 wherein said lubricant additive dissolvable gel (10) contains an antioxidant component adapted for release into said flow of lubricant over time.

15. The mechanical system of claim 5 wherein said lubricant additive dissolvable gel (10) contains a wear resistant component adapted for release into said flow of lubricant in response to an increase in temperature.

16. A containment structure (200) for holding a volume of lubricant additive gel (10) for controlled release into a flow of lubricant in a mechanical system in close proximity to at least one wear critical surface, comprising:
 a plurality of interconnected surfaces (202) defining an enclosed volume, said lubricant additive gel contained within said enclosed volume;
 wherein at least one of said interconnected surfaces includes a plurality of openings through which lubricant additives contained within said lubricant additive gel may be released from said enclosed volume; and
 wherein said plurality of interconnected surfaces are configured for fitment within a receiving recess in said mechanical system in close proximity to at least one wear critical surface and in operative contact with said flow of lubricant.

17. The containment structure of claim 16 wherein at least one of said plurality of interconnected surfaces (202) is composed of a mesh defining said plurality of openings.

* * * * *